E. W. THOMAS.
VARIABLE SPEED GEARING.
APPLICATION FILED OCT. 31, 1914.

1,124,974.

Patented Jan. 12, 1915.
3 SHEETS—SHEET 1.

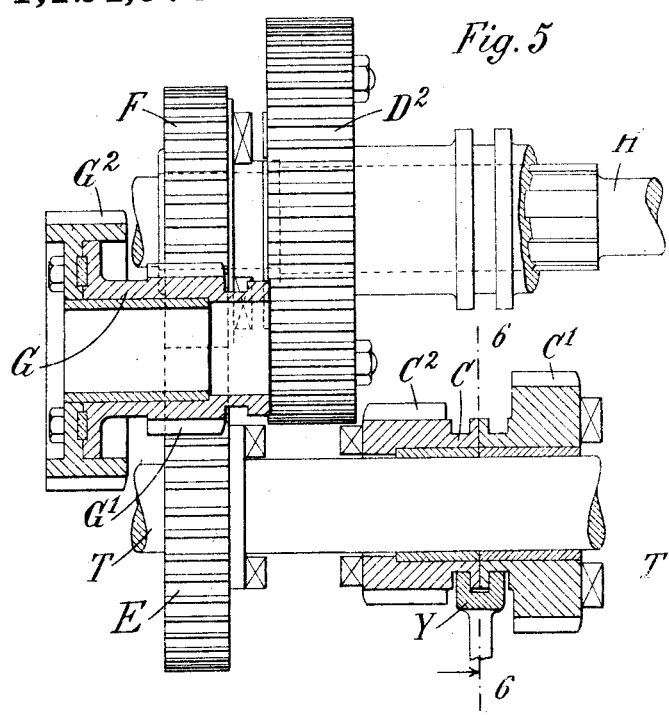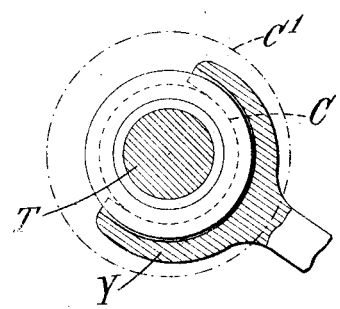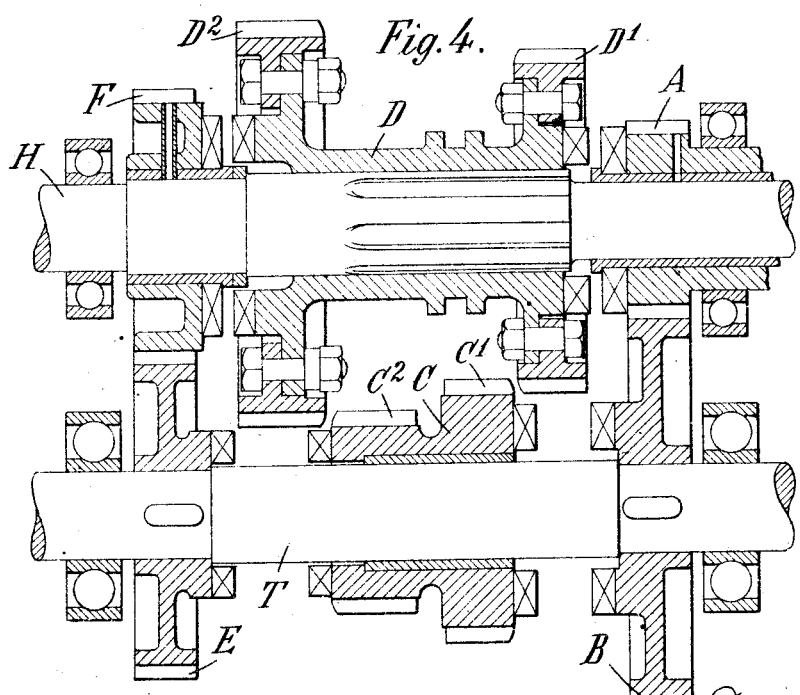

E. W. THOMAS.
VARIABLE SPEED GEARING.
APPLICATION FILED OCT. 31, 1914.
1,124,974.
Patented Jan. 12, 1915.
3 SHEETS—SHEET 3.
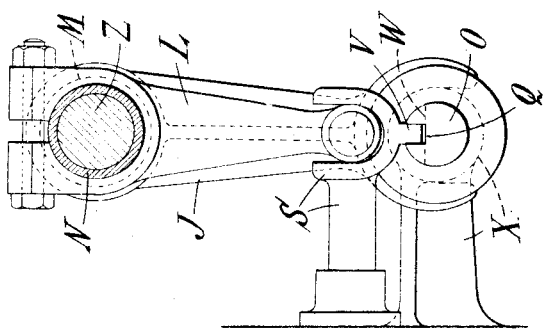
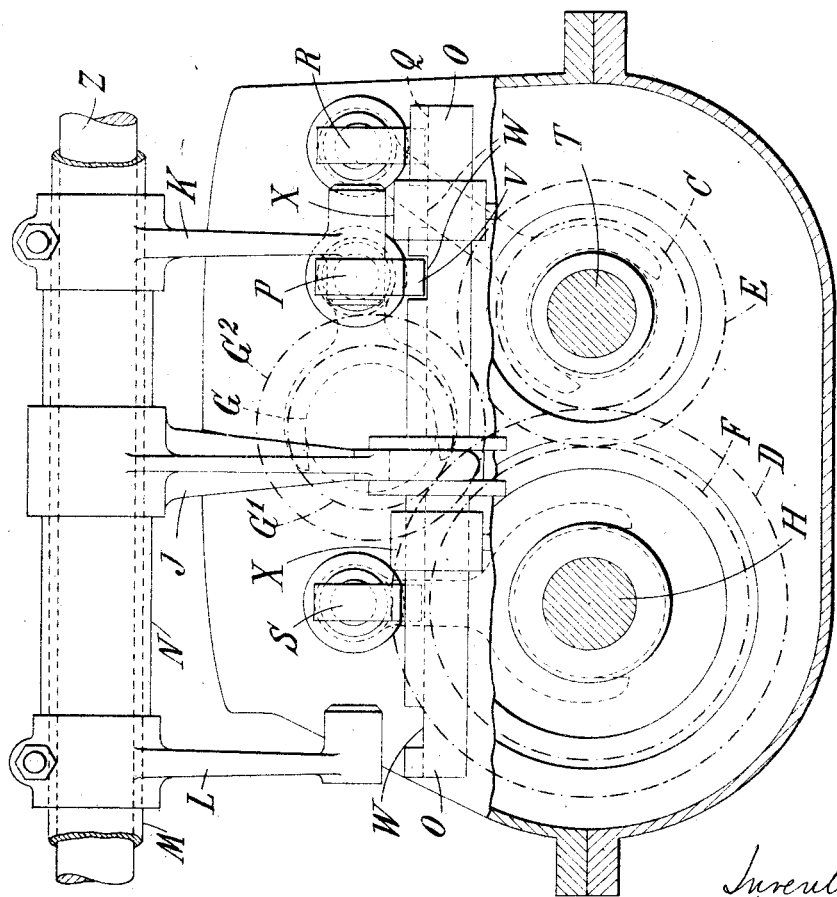

UNITED STATES PATENT OFFICE.

EDWARD WILLIAM THOMAS, OF LUTON, ENGLAND.

VARIABLE-SPEED GEARING.

1,124,974.  Specification of Letters Patent.  Patented Jan. 12, 1915.

Application filed October 31, 1914. Serial No. 869,718.

*To all whom it may concern:*

Be it known that I, EDWARD WILLIAM THOMAS, a subject of the King of Great Britain and Ireland, residing at 57 Leagrave road, Luton, in the county of Bedford, England, have invented new and useful Improvements Relating to Variable-Speed Gearing, of which the following is a specification.

This invention relates to variable speed gearing and is intended more especially for the gear boxes of motor cars. It embraces change-speed mechanism of that type in which there is no load at first upon any gear wheel which slides into toothed engagement with another, but the load comes upon it only after the teeth are in mesh through the engagement of the dogs. (I use this word throughout for convenience, without desiring to limit the invention to a dog or any other kind of clutch.)

Certain advantages, such as reduction in length of box and simplicity of operation, will be manifest from the following description of the invention.

I will describe my invention as carried out in a box having as usual the engine and main shafts inserted into the box end to end parallel to a lay shaft. It will be understood nevertheless that the box might be of the kind where there is no lay shaft but in which the engine and main shafts overlap.

It is fairly customary for the "first-speed-and-reverse" wheel to be splined on the lay shaft (or on the main shaft where the lay shaft is absent), but it is essential to the working of my invention that this wheel should be loose on its shaft. In actual practice, however, I utilize this wheel only as a first-speed or a first-and-second-speed driving wheel and I make it have sufficient drag to be given an initial movement when the car is starting from rest, which will prevent any undue delay in its sliding into gear with the driven wheel splined on to the main shaft which would then be stationary.

I will describe the said invention further, with reference to the accompanying drawings in which:—

Figure 2:
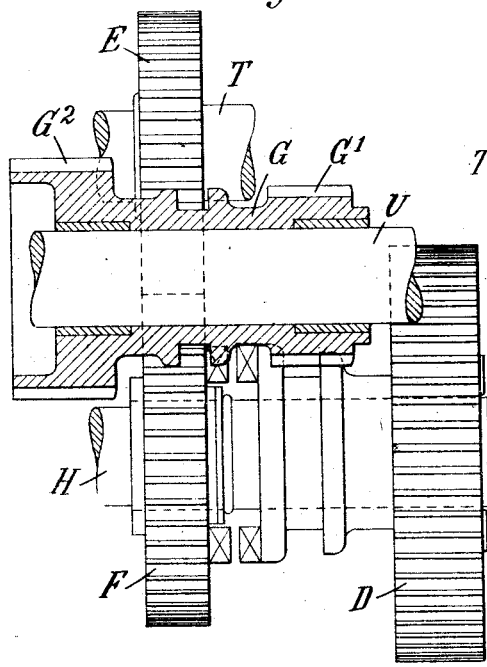
Figure 3:
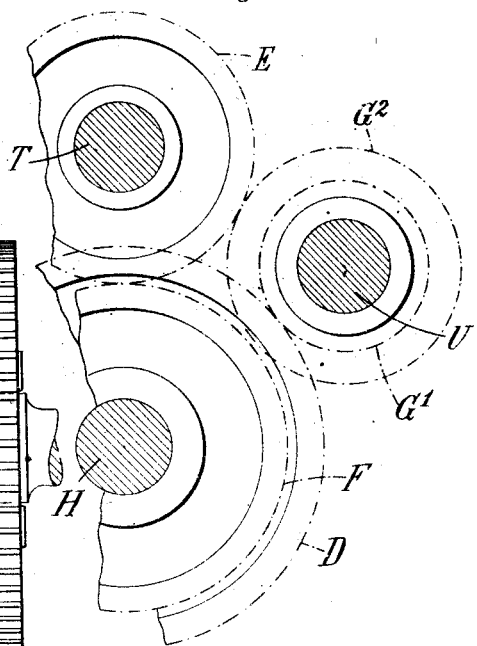
Figure 1:
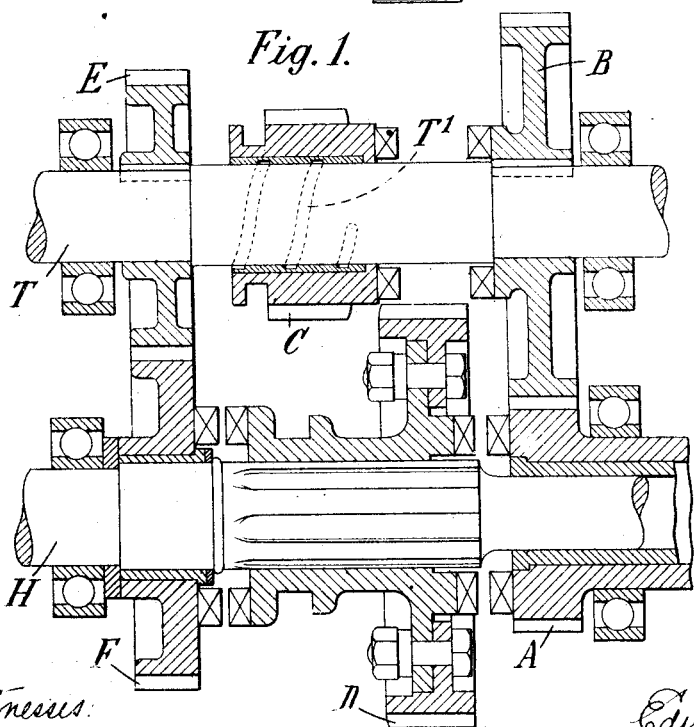

Figure 1 is a sectional plan of a 3-speed gear. Fig. 2 is a sectional plan of a reverse gear suitable for use therewith. Fig. 3 is an end view of Fig. 2. Fig. 4 is a sectional plan of a 4-speed gear. Fig. 5 is a sectional plan of a reverse gear suitable for use therewith, introducing also a slight modification of the first-and-second-speed wheel. Fig. 6 is a section on line 6—6 of Fig. 5. Fig. 7 is an end view of the shifting and locking mechanism for use with my gear box according to my invention, showing the reverse gear in operative position. Fig. 8 is a view of the locking mechanism seen at right angles to Fig. 7.

Describing my invention as applied to a 3-speed gear box of the kind above referred to, illustrated in Fig. 1, the lay shaft T carries the two constant-mesh wheels B and E keyed thereon as at A', the first one B, (sometimes called the operating wheel) at the forward end and the second wheel E at the rear. Wheel B is in contant mesh with the stem pinion A, formed integrally with the engine shaft. Wheel E is contantly engaged with the gear wheel F, which is freely mounted upon the main shaft H. The wheel C lying between wheels B and E can be slid toward wheel B and become clutched thereto. Wheel C may be moved in mesh with wheel D which is splined on to the main shaft H between wheels F and A and is adapted to slide toward either of these latter and become clutched to them. In no case is there any load upon the teeth of gear wheels while they are sliding into mesh. In this 3-speed box the top speed is obtained by sliding wheel D into engagement with wheel A, the wheels C and D being completely out of mesh with any other wheel, and therefore wasting no energy. For the second speed, the wheel D is slid back till it clutches with wheel F. For this purpose wheel D is provided with a long boss for carrying the dogs in closer proximity to those upon the wheel F.

I may here mention the most important feature of my invention, a feature which economizes room in the box, and this is that the wheel C is given an identical and synchronous travel with wheel D, in order to prevent their meshing with one another. If wheel C were left stationary, the intermeshing could be avoided only by leaving a greater distance between them in the design of the box, which would therefore be longer by this amount. I thus attain a valuable result by sliding wheels C and D simultaneously by means of the same shifting mechanism, and this being so, I find it unnecessary to provide a separate locking device for wheel C when sliding simultaneously with wheel D.

For the first or low speed, wheel C is slid into gear with wheel D, and only after the wheels have meshed through, say, half of their width (or more or less), the dogs on wheel C engage with those upon wheel B, and wheel C thereupon becomes fast upon the lay shaft T. For the reverse, as will be seen in either Fig. 2 or Fig. 3, the ordinary sliding action may be resorted to, and a double pinion G is mounted on a third shaft U and slid into engagement with wheels D and E simultaneously.

The drag of the wheel C (Fig. 1) may be produced by closing its oil spiral $T^1$, which is known to cause considerable pressure in the oil between the lay shaft and the wheel, quite sufficient for my purpose.

Describing my invention as embodied in a 4-speed and reverse box, illustrated in Fig. 4, the same general principle is observed. The essential modifications are that the slidable wheels on the lay and main shafts, namely, the wheels C and D, shall have two points of engagement with one another, representing different speed ratios, and for bringing these into mesh in the proper order, it is convenient that one shall be, as it were, within the length of the other, so that it will gear both when slid forward and backward. Thus, wheel C is made conveniently shorter than wheel D in order that it may be as light as possible, being subject to sudden speed variation. The wheel C moreover is adapted to clutch against wheel E when slid up to it. In this particular construction and arrangement of gear box, for four speeds and reverse, the wheel C is practically a loose sleeve with a gear wheel $C^1$ on the forward end and a smaller gear wheel $C^2$ on the rear. The wheel D is likewise in the form of a sleeve but splined on the main shaft H, having a forward gear wheel $D^1$ (adapted to engage wheel $C^1$) and a rear gear wheel $D^2$ (adapted to engage with wheel $C^2$). In neutral position, the wheels $C^1$ $C^2$ lie between wheels $D^1$ $D^2$ and just clear of the same, the amount of the clearance being as small as is practicable.

For top-speed direct drive, wheel D is slid until wheel $D^1$ clutches pinion A into the engine shaft, and interference of wheel $D^2$ with wheel $C^2$ is prevented, not by leaving a large amount of clearance between them (which would increase the length of the box unnecessarily) but by also sliding wheel C at the same time and in the same direction as wheel D, and it therefore remains out of gear with wheel D or any other member, as shown in Fig. 4.

Third speed is produced by sliding wheel D backward, and wheel C likewise. Wheel $D^2$ clutches with the final wheel F, so that the train then comprises wheels A, B, E, F, $D^2$, in which wheels F and D revolve as one member.

Second speed is brought about by sliding wheel D into neutral position, that is, free from wheel F on the one hand and pinion A on the other. Wheel C is slid along simultaneously with wheel D and then carried along still farther until wheel $C^1$ meshes with wheel $D^1$ and finally clutches with wheel B. The drive will then be from pinion A through wheels B $C^1$ to $D^1$.

When first or low speed is required wheel C is slid backward, thus releasing the drive between wheels $C^1$ and $D^1$. Almost at once wheel $C^2$ engages wheel $D^2$, ultimately becoming clutched against wheel E, whereupon the power is carried through wheels A, B, E, $C^2$, $D^2$. The reverse as clearly shown in Fig. 5, is obtained by sliding the duplex pinion G until its gear wheel $G^1$ meshes with wheel $D^2$ and the wheel $G^2$ with wheel E, the engagement of wheel $G^2$ with wheel E being slightly in advance of wheel $G^1$ with wheel $D^2$, in order to insure prompt engagement of the other teeth when the car is at rest.

The duplex sleeve C of Fig. 4 may be divided into a pair of wheels $C^1$ and $C^2$ as shown in Fig. 5, each one capable of driving independently its particular gear wheel $D^1$ or wheel $D^2$ when its dogs are clutched. Even in its divided form however, the sleeve C is slid along the shaft as if it were one unit by means of a fork Y (see also Fig. 6) which is channeled so as to tie the two wheels $C^1$, $C^2$ loosely together when passed over their flanges which butt against one another.

Referring now to Figs. 7 and 8, certain operating levers K and L are keyed to the usual sliding tube M carried on the rod Z and actuated direct from the change speed lever at the side of the chauffeur. Upon the tube M is loosely mounted a sleeve N carrying an arm J fixed thereon, the purpose of which is to communicate a parallel sliding movement to a locking bar O carried in guides X X. This bar is provided with a groove Q along its upper side adapted to restrain the shifting rods P R S, owing to the latter having heels V projecting into said groove Q, which, however, has gaps W at intervals. The position in Fig. 7 is as set for the reverse, and it will be noticed that a gap in the bar O comes exactly opposite the shifting rod P, permitting that rod to be moved longitudinally by the swing of the lever K, so causing the reverse gears $G^1$ and $G^2$ to come into operation. It will be noticed also that in this position the shifting rods R and S, operating the 1st speed and 2nd and 3rd, remain locked by the bar O, due to the absence of any gap W opposite such rods.

The arm J partakes of the sliding movement of the levers K and L only and not of their swinging or angular movement.

The 1st speed is obtained by moving bodily the levers L, J and wheel K, by means of the sliding tube M until K engages with the shifting rod R; the shifting rods P and S being free of the levers L and K. The arm J will then have moved the locking bar O, so as to bring a gap in the latter opposite the shifting lever R, but will have locked the shifting rods P and S. This enables the 1st speed wheel C to be slid into engagement.

A further movement of the levers L, K, and J, will bring the lever L into engagement with the shifting rod S, but the lever K, owing to the length of its shifting boss, will still be in engagement with shifting rod R, thereby enabling the wheels C and D to be operated simultaneously. When in this position the shifting rod P remains locked by there being no opposing gap in the locking bar O.

Fig. 8 shows clearly the form of the shifting rod S, (P and R being similar also) the locking bar O, and the method of mounting the shifting levers J and L.

I claim:—

1. In variable speed gearing, a main shaft, a spur wheel on one end of the main shaft, a driven wheel on the opposite end of the main shaft, and an intermediate sliding gear splined to the main shaft, a lay shaft associated with the main shaft, a drive wheel keyed on one end of the lay shaft and in mesh with the spur wheel of the main shaft, a wheel keyed on the opposite end of the lay shaft and in mesh with the second mentioned wheel, a sliding wheel on the lay shaft, adapted to mesh with the sliding wheel of the main shaft, said sliding wheel of the lay shaft adapted to be clutched with the drive wheel, and the sliding wheel of the main shaft adapted to be clutched to the driven wheel of the main shaft, and means for effecting said clutching operations, and adapted to slide the gears simultaneously, in the same direction.

2. In variable speed gearing, a main shaft, spaced gear wheels on the main shaft and an intermediate slidable gear splined to the main shaft, a lay shaft, spaced gears keyed on the lay shaft and an intermediate slidable gear, said last mentioned slidable gear adapted to be clutched with one of the gears of the lay shaft, said slidable gears adapted to mesh with each other, means for sliding the slidable gears, comprising rods, a sliding tube, and arms carried thereby, means for locking the rods, said locking means comprising a sleeve loosely carried on the sliding tube, an arm on the sleeve and a slidable bar engaged with one end of the arm, said bar having a longitudinal groove, a portion of each of the sliding rods extending into the groove, and the wall of the groove having recesses for allowing the sliding rods to move therefrom.

3. In variable speed gearing, a main shaft, a gear wheel mounted on each end of the main shaft, an intermediate sliding wheel splined on the main shaft, and having gear wheels of different diameters, a lay shaft associated with the main shaft, a gear wheel keyed on each end of the lay shaft, and an intermediate sliding wheel having gear wheels of different diameters, the gear wheels on the ends of the main shaft adapted to mesh with the respective gear wheels on the ends of the lay shaft, the sliding gear wheels of the lay shaft adapted to mesh alternatively with the peripheries of the sliding intermediate gear wheels of the main shaft, all of said wheels have clutch faces, and means for sliding said slidable gears.

4. In combination, a shaft, a gear wheel on the shaft, said gear wheel having a spiral oil groove closed at one end, whereby rotation of the gear wheel causes a pressure of the oil held in the groove.

In witness whereof I have hereunto affixed my signature in the presence of the two subscribing witnesses.

EDWARD WILLIAM THOMAS.

Witnesses:
L. DEL MONT,
GEORGE HAM.